US012623751B2

(12) United States Patent
Black-Macken

(10) Patent No.: US 12,623,751 B2
(45) Date of Patent: May 12, 2026

---

(54) BICYCLE DRIVETRAIN AND BICYCLE INCLUDING THE SAME

(71) Applicant: Ryan Black-Macken, South Pasadena, CA (US)

(72) Inventor: Ryan Black-Macken, South Pasadena, CA (US)

( * ) Notice: Subject to any disclaimer, the term of this patent is extended or adjusted under 35 U.S.C. 154(b) by 0 days.

(21) Appl. No.: 18/728,333

(22) PCT Filed: Jan. 13, 2023

(86) PCT No.: PCT/US2023/010830
§ 371 (c)(1),
(2) Date: Jul. 11, 2024

(87) PCT Pub. No.: WO2023/137196
PCT Pub. Date: Jul. 20, 2023

(65) Prior Publication Data
US 2025/0074543 A1      Mar. 6, 2025

Related U.S. Application Data

(60) Provisional application No. 63/299,351, filed on Jan. 13, 2022.

(51) Int. Cl.
*B62M 9/08* (2006.01)
*B62M 9/16* (2006.01)

(52) U.S. Cl.
CPC ............... *B62M 9/08* (2013.01); *B62M 9/16* (2013.01)

(58) Field of Classification Search
CPC .......... B62M 9/08; B62M 9/16; B62M 23/00; B62M 9/12; B62M 2009/007; F16H 55/56; F16H 61/662

USPC .......................................................... 474/16
See application file for complete search history.

(56) References Cited

U.S. PATENT DOCUMENTS

| | | | | | |
|---|---|---|---|---|---|
| 1,618,644 | A | * | 2/1927 | Dickson | F16D 43/10 |
| | | | | | 73/551 |
| 3,688,595 | A | * | 9/1972 | Johannes Bauer | F16H 9/24 |
| | | | | | 474/201 |
| 3,837,234 | A | * | 9/1974 | Chao | B62M 9/04 |
| | | | | | 474/37 |
| 3,926,020 | A | * | 12/1975 | Dantowitz | F16H 61/66245 |
| | | | | | 280/238 |
| 4,119,326 | A | * | 10/1978 | Porter | B62M 9/06 |
| | | | | | 474/37 |
| 4,367,067 | A | * | 1/1983 | Chao | F16G 5/18 |
| | | | | | 474/154 |

(Continued)

OTHER PUBLICATIONS

International Search Report and Written Opinion for Application No. PCT/US23/10830, mailed Apr. 13, 2023, 12 pages.

*Primary Examiner* — Henry Y Liu
(74) *Attorney, Agent, or Firm* — Womble Bond Dickinson (US) LLP

(57) ABSTRACT

A bicycle drivetrain includes a front crankset having an axle, a main rider, a glider, an outer mesh plate coupled to the main rider, an inner mesh plate coupled to the glider that is configured to move toward and away from the outer mesh plate, and a spring configured to bias the inner mesh plate toward the outer mesh plate. The bicycle drivetrain also includes a rear cog and a hybrid chain connecting the front crankset and the rear cog. The hybrid chain is configured to mesh with the outer mesh plate and the inner mesh plate.

18 Claims, 11 Drawing Sheets

(56) References Cited

U.S. PATENT DOCUMENTS

| | | | | | |
|---|---|---|---|---|---|
| 4,398,899 | A | * | 8/1983 | Wood | F16H 55/56 |
| | | | | | 474/37 |
| 4,457,739 | A | * | 7/1984 | Iseman | F16H 55/54 |
| | | | | | 474/69 |
| 4,741,546 | A | * | 5/1988 | Reswick | F16H 9/10 |
| | | | | | 280/236 |
| 4,743,041 | A | * | 5/1988 | Vazin | B62M 9/08 |
| | | | | | 474/70 |
| 4,781,656 | A | * | 11/1988 | Brackett | F16H 9/10 |
| | | | | | 474/39 |
| 4,925,201 | A | * | 5/1990 | Leonard | B62M 9/08 |
| | | | | | 280/238 |
| 5,405,158 | A | * | 4/1995 | Wilding | B62M 9/08 |
| | | | | | 474/37 |
| 6,086,492 | A | * | 7/2000 | Nakano | F16H 55/563 |
| | | | | | 477/44 |
| 7,637,828 | B2 | * | 12/2009 | Murayama | F16H 57/04 |
| | | | | | 474/14 |
| 7,892,121 | B2 | * | 2/2011 | Oishi | F16H 57/0415 |
| | | | | | 474/46 |
| 7,955,203 | B2 | * | 6/2011 | Siman-Tov | F16G 13/02 |
| | | | | | 474/155 |
| 9,242,693 | B2 | * | 1/2016 | Voss | B62K 25/20 |
| 10,221,925 | B2 | * | 3/2019 | Pattakos | F16H 9/18 |
| 11,208,175 | B2 | * | 12/2021 | Faneco | B62M 9/08 |
| 2007/0105670 | A1 | * | 5/2007 | Oishi | F16H 55/563 |
| | | | | | 474/46 |
| 2021/0354782 | A1 | * | 11/2021 | Eveleigh | B62M 9/1242 |

* cited by examiner

BICYCLE DRIVETRAIN AND BICYCLE INCLUDING THE SAME

CROSS-REFERENCE TO RELATED APPLICATION(S)

This application is a U.S. National Phase Patent Application of International Patent Application Number PCT/US2023/10830, filed on Jan. 13, 2023, which claims priority to and the benefit of U.S. Provisional Application No. 63/299,351, filed Jan. 13, 2022, the entire content of each of which are incorporated herein by reference.

BACKGROUND

1. Field

Aspects of embodiments of the present disclosure are related to a bicycle drivetrain and a bicycle including the bicycle drivetrain.

2. Description of the Related Art

Bicycles were developed well over a hundred years ago and have been in common use for at least the past century. Modern bicycles include pedals that are moved by a rider. The pedals move a chain, and the chain turns a sprocket that is fixed to a rear wheel to turn (e.g., rotate) the rear wheel and propel the bicycle and rider forward.

Initially, bicycles were limited to a single gear (e.g., a single gearing or a single speed). In the early 20$^{th}$ century, a variable-ratio bicycle drivetrain was developed that used a derailleur to move the chain between different sized sprockets. Modernly, bicycles include front and rear sprockets, with the front sprocket being connected to the pedals and the rear sprocket being connected to the rear wheel. Derailleurs are often used on both the front and rear sprockets, allowing for different combinations of gear ratios during use. In use, the rider uses handlebar mounted controls to select different front and rear sprockets, and the derailleurs move the chain to the desired sprocket(s).

Bicycle drivetrains featuring sprockets and derailleurs, however, suffer drawbacks including that the rider must be actively pedaling to change gears and that the chain may get stuck between sprockets or may fall off the sprockets altogether. Further, to provide a meaningful number of available gear ratios, a rear derailleur and corresponding rear sprocket set should be included, increasing the weight and complexity of the bicycle drivetrain, including the sprung weight on the rear wheel.

SUMMARY

The present disclosure relates to various embodiments of a bicycle drivetrain. In one embodiment, the bicycle drivetrain includes a front crankset having an axle, a main rider, a glider, an outer mesh plate coupled to the main rider, an inner mesh plate coupled to the glider, that is configured to move toward and away from the outer mesh plate, and a spring configured to bias the inner mesh plate toward the outer mesh plate. The bicycle drivetrain also includes a rear cog and a hybrid chain connecting the front crankset and the rear cog. The hybrid chain is configured to mesh with the outer mesh plate and the inner mesh plate.

The pattern on each the inner mesh plate and the outer mesh plate may include a stepped concave pattern (such as a number of depressions arranged in a number of concentric rings) or a stepped convex pattern (such as a number of protrusions arranged in a number of concentric rings).

The bicycle drivetrain may also include roller weights or an index shifter coupled to the glider to adjust a gear ratio of the bicycle drivetrain.

The inner mesh plate and the outer mesh plate may be cambered away from each other. For example, an outer surface of the inner mesh plate facing the outer mesh plate and an inner surface of the outer mesh plate facing the inner mesh plate may each be angled at an angle in a range from approximately 2 degrees to approximately 10 degrees relative to a plane perpendicular to an axis of the axle.

Lateral sides of the hybrid chain facing the inner mesh plate and the outer mesh plate may include a chain pattern configured to engage the pattern of the inner mesh plate and the outer mesh plate. The chain pattern may include a number of projections or grooves each having a triangular cross-sectional shape. The chain pattern may be tapered at an angle, such as approximately 2.5 degrees.

The bicycle drivetrain may also include a tension idler sprocket and a fixed idler sprocket.

The rear cog may include a pair of mesh plates.

The present disclosure also relates to various embodiments of a bicycle including the bicycle drivetrain. In one or more embodiments, the bicycle includes a frame, a front wheel rotatably coupled to the frame, a rear wheel rotatably coupled to the frame, handlebars coupled to the frame, and bicycle drivetrain coupled to the frame.

The bicycle may be a hardtail bicycle (including only a front suspension) or a full suspension bicycle (including both a front suspension and a rear suspension).

This summary is provided to introduce a selection of features and concepts of embodiments of the present disclosure that are further described below in the detailed description. This summary is not intended to identify key or essential features of the claimed subject matter, nor is it intended to be used in limiting the scope of the claimed subject matter. One or more of the described features may be combined with one or more other described features to provide a workable bicycle drivetrain or a workable bicycle including a bicycle drivetrain.

BRIEF DESCRIPTION OF THE DRAWINGS

These and other aspects and features of the present disclosure will be further appreciated and better understood with reference to the specification, claims, and appended drawings, in which:

DETAILED DESCRIPTION

Figure 1A:
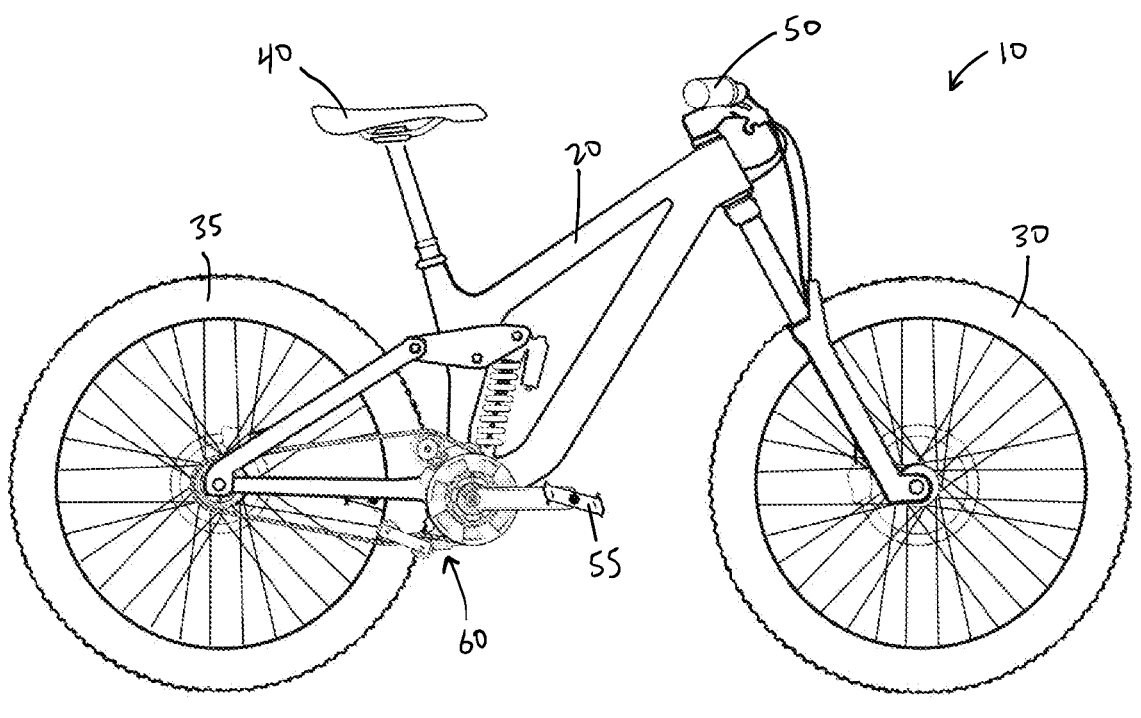
FIG. 1A shows a full suspension bicycle including a bicycle drivetrain according to an embodiment of the present disclosure.

The detailed description set forth below, in connection with the appended drawings, is intended as a description of example embodiments of the present disclosure and is not intended to represent the only forms in which the present disclosure may be embodied. The description sets forth aspects and features of the present disclosure in connection with the illustrated example embodiments. It is to be understood, however, that the same or equivalent aspects and features may be accomplished by different embodiments, and such other embodiments are encompassed within the spirit and scope of the present disclosure. As noted elsewhere herein, like reference numerals in the description and the drawings are intended to indicate like elements. Further, descriptions of features, configurations, and/or other aspects within each embodiment should typically be considered as available for other similar features, configurations, and/or aspects in other embodiments.

Figure 1B:
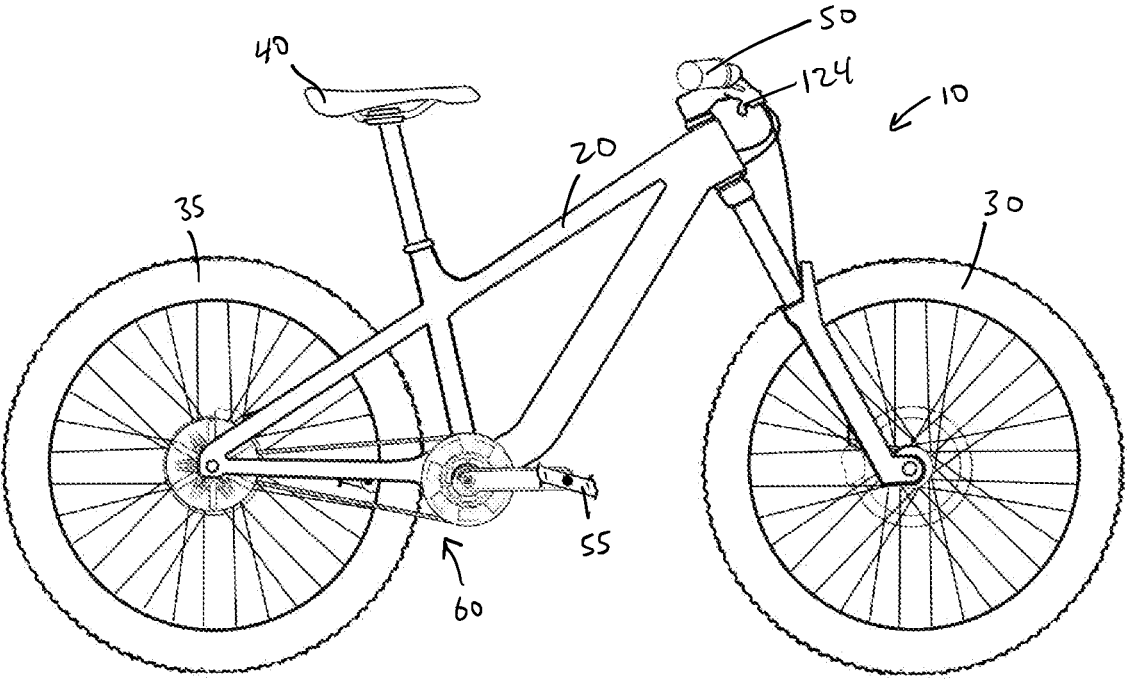
FIG. 1B shows a "hardtail" bicycle including a bicycle drivetrain according to another embodiment of the present disclosure.

FIGS. 1A-1B show a bicycle 10 including a frame 20, front wheel 30, rear wheel 35, seat 40, handlebars 50, pedals 55, and bicycle drivetrain 60. For convenience, the "bicycle drivetrain 60" will be referred to herein as the "drivetrain 60." FIG. 1A depicts an embodiment of the bicycle 10 having a full suspension, and FIG. 1B depicts a "hardtail" embodiment of the bicycle 10 (i.e., an embodiment in which the bicycle 10 includes only a front suspension). The front and rear wheels 30 and 35 are rotatably coupled to the frame 20. A rider sits on the seat 40 and engages with the drivetrain 60, to be described in more detail below, to move the bicycle 10 in a forward direction. The rear wheel 35 may have a fixed orientation relative to the frame 20, such as parallel with the frame 20. On the other hand, the front wheel 30 rotates and is connected to the handlebars 50 to pivot relative to the frame 20. In this manner, the rider steers the bicycle 10 by using the handlebars to pivot the front wheel 30 relative to the frame 20.

Figures 2A, 2B:
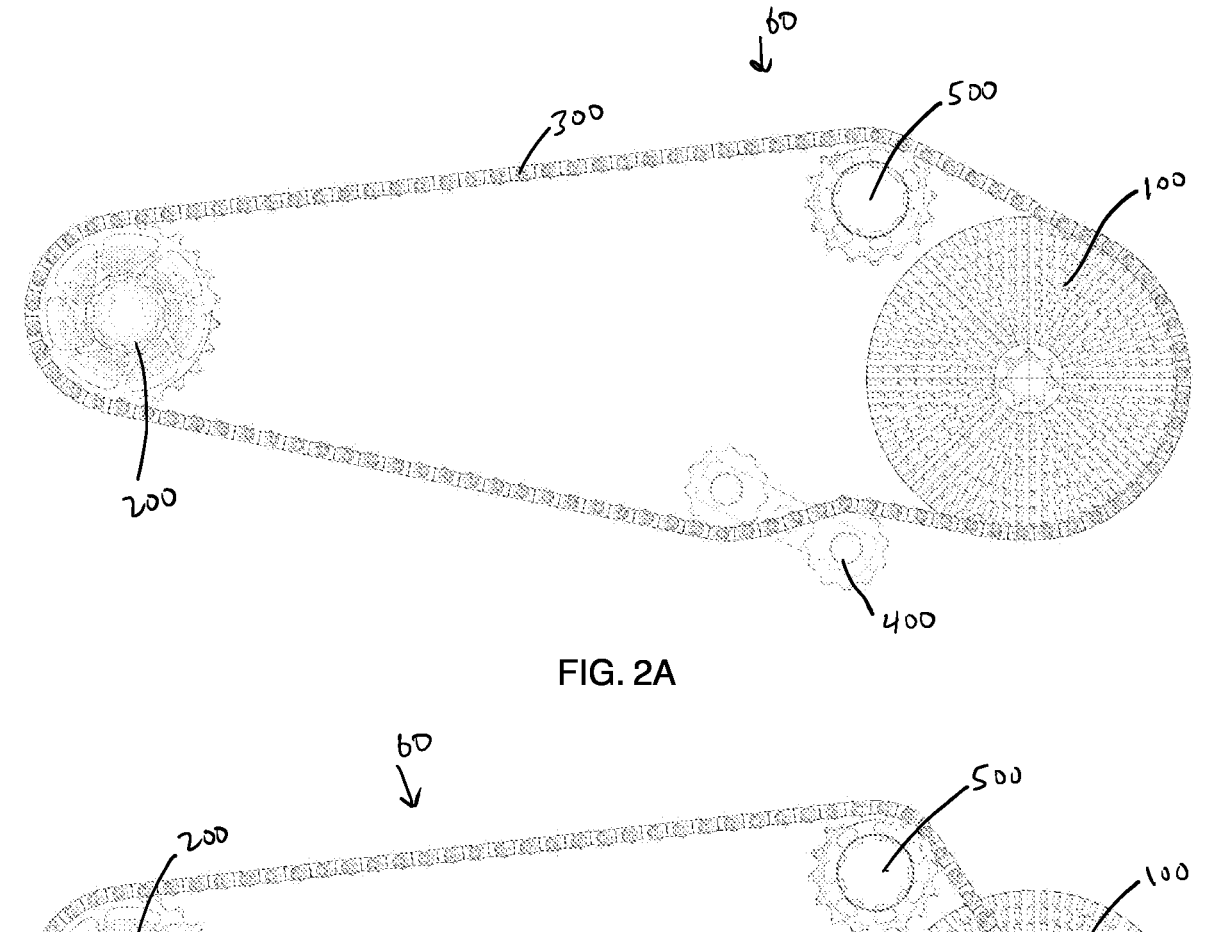
FIGS. 2A-2B show the bicycle drivetrain shown in FIG. 1A in a high gear configuration and a low gear configuration, respectively, with idlers.

FIGS. 2A-2B shows the embodiment of the drivetrain 60 associated with the full suspension bicycle 10 illustrated in FIG. 1A with the other elements of the bicycle 10 omitted for clarity. Referring to FIGS. 1A and 2A-2B, the drivetrain 60 includes a front crankset 100, a rear cog (or rear sprocket) 200, a hybrid chain 300 connected around both the front crankset 100 and the rear cog 200, a tension idler sprocket 400, and a fixed idler sprocket (e.g., guide idler sprocket) 500. The pedals 55 are connected to the front crankset 100. FIG. 2A depicts the bicycle drivetrain 60 in a high gear ratio configuration, and FIG. 2B depicts the bicycle drivetrain 60 in a low gear ratio configuration. It should be understood that the drivetrain 60 is configured to exhibit any intermediate gear ratio between the high gear ratio configuration depicted in FIG. 2A and the low gear ratio configuration depicted in FIG. 2B.

As the rider rotates the pedals 55 in a forward direction (e.g., a clockwise direction when viewing the bicycle 10 from the side shown in FIGS. 1A-1B), the front crankset 100 is rotated in the same forward direction. As will be explained below in more detail, the front crankset 100 interacts with the hybrid chain 300 as it rotates in the forward direction to move the hybrid chain 300 around the front crankset 100 in the forward direction and around the rear cog 200 in the same forward direction. Because the rear cog 200 is connected to the rear wheel 35, the rear wheel 35 is rotated by the rear cog 200, which propels the bicycle 10 forward.

While the hybrid chain 300 is in motion while the bicycle 10 is moving, for convenience of explanation, the portion of the hybrid chain 300 between the rear cog 200 and the front crankset 100 moving in the forward direction will be referred to as the "top half" of the hybrid chain 300 while the portion of the hybrid chain 300 between the front crankset 100 and the rear cog 200 moving in the rearward direction will be referred to as the "bottom half" of the hybrid chain 300.

The tension idler sprocket 400 is configured to apply tension to the hybrid chain 300 by, for example, pivoting about a pivot point spaced apart from the tension idler sprocket 400 itself and by having a tension spring controlling the pivoting. The tension idler sprocket 400 may contact the bottom half of the hybrid chain 300 from the bottom thereof to improve contact between the hybrid chain 300 and the front crankset 100. The tension idler sprocket 400 may be a conventional tension idler sprocket as known to those of ordinary skill in the art. The fixed idler sprocket 500 may assist with guiding the chain into the front crankset 100, for example, laterally and vertically by being arranged to contact the upper half of the hybrid chain 300 from a bottom thereof. In one or more embodiments, the drivetrain 60 may be provided with the tension idler sprocket 400 and the fixed idler sprocket 500 when the bicycle 10 is a full suspension bicycle, because in full suspension bicycles there is chain growth through the travel of the rear wheel 35 and the idlers take up the slack caused by the chain growth.

Figure 2C:
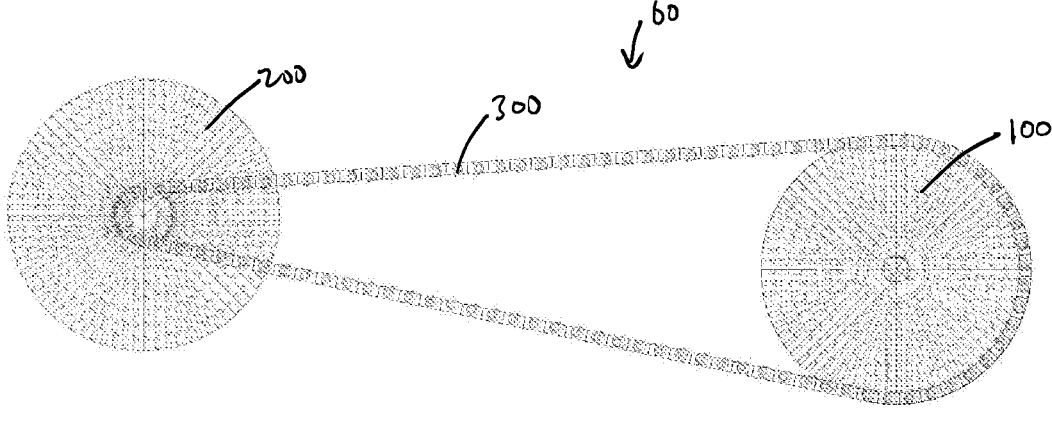
FIGS. 2C-2D show the bicycle drivetrain shown in FIG. 1B in a high gear configuration and a low gear configuration, respectively, without idlers.
Figure 2D:
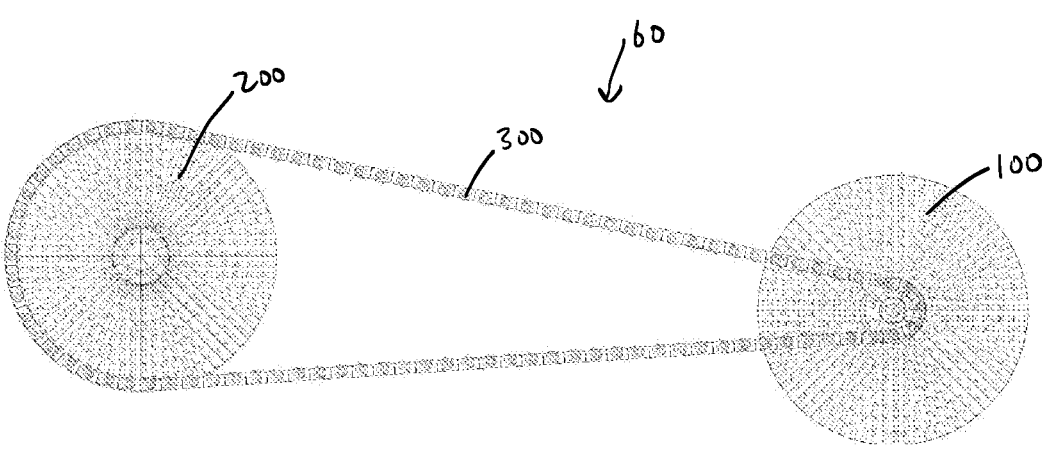

However, in some embodiments, the tension idler sprocket 400 and/or the fixed idler sprocket 500 may be omitted, as shown in FIGS. 2C-2D. FIGS. 2C-2D depict the bicycle drivetrain in a high gear configuration and a low gear configuration, respectively. It should be understood that the drivetrain 60 is configured to exhibit any intermediate gear ratio between the high gear ratio configuration depicted in FIG. 2C and the low gear ratio configuration depicted in FIG. 2D. For example, in the embodiment of the drivetrain 60 illustrated in FIGS. 2C-2D, the drivetrain 60 may include dual mesh plates (i.e., a pair of inner and outer mesh plates 131, 132 in the front crankset 100 and a pair of inner and outer mesh plates 201, 202 in the rear cog 200), which eliminates the need for the tension idler sprocket 400 and the fixed idler sprocket 500 because the slack in the hybrid chain 300 is picked up in the movement of the mesh plates 131, 132, 201, 202 (i.e., the drivetrain 60 may be a zero idler). In one or more embodiments, the drivetrain 60 may be a zero idler (i.e., provided without the tension idler sprocket 400 and the fixed idler sprocket 500) when the bicycle 10 is a "hardtail" (as shown, for example, in FIG. 1B) or the frame 20 of the bicycle 10 has no suspension because there is no growth in the chain 300 in such bicycles, which makes the drivetrain 60 simpler in some respects, lighter, and reduces the overall length of the hybrid chain 300.

Figure 3A:
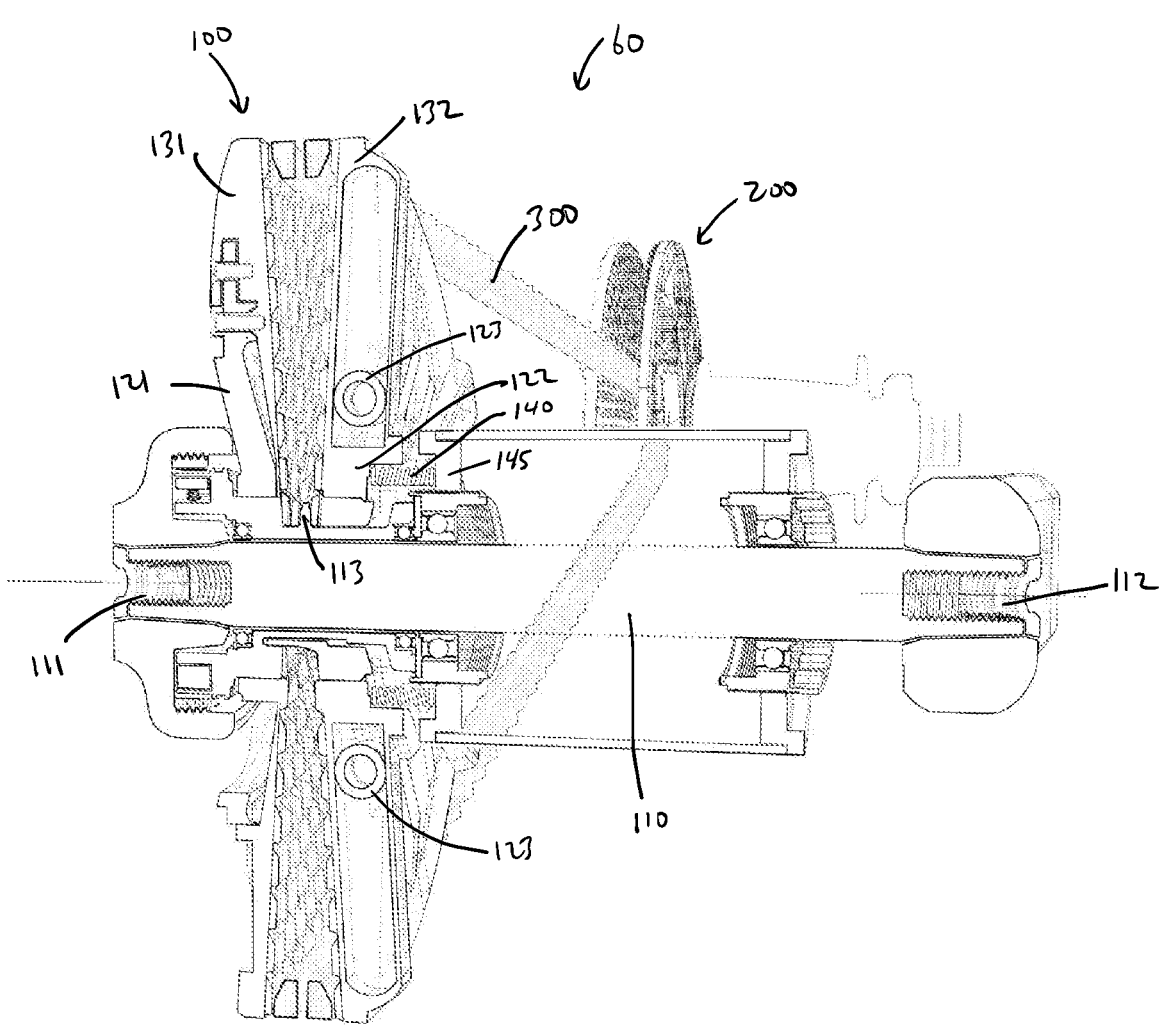
FIGS. 3A-3B depict a cross-section through the front crankset of the bicycle drivetrain shown in FIGS. 1A-1B in a high gear ratio configuration and a low gear ratio configuration, respectively, having an automatic shifter.
Figure 3B:
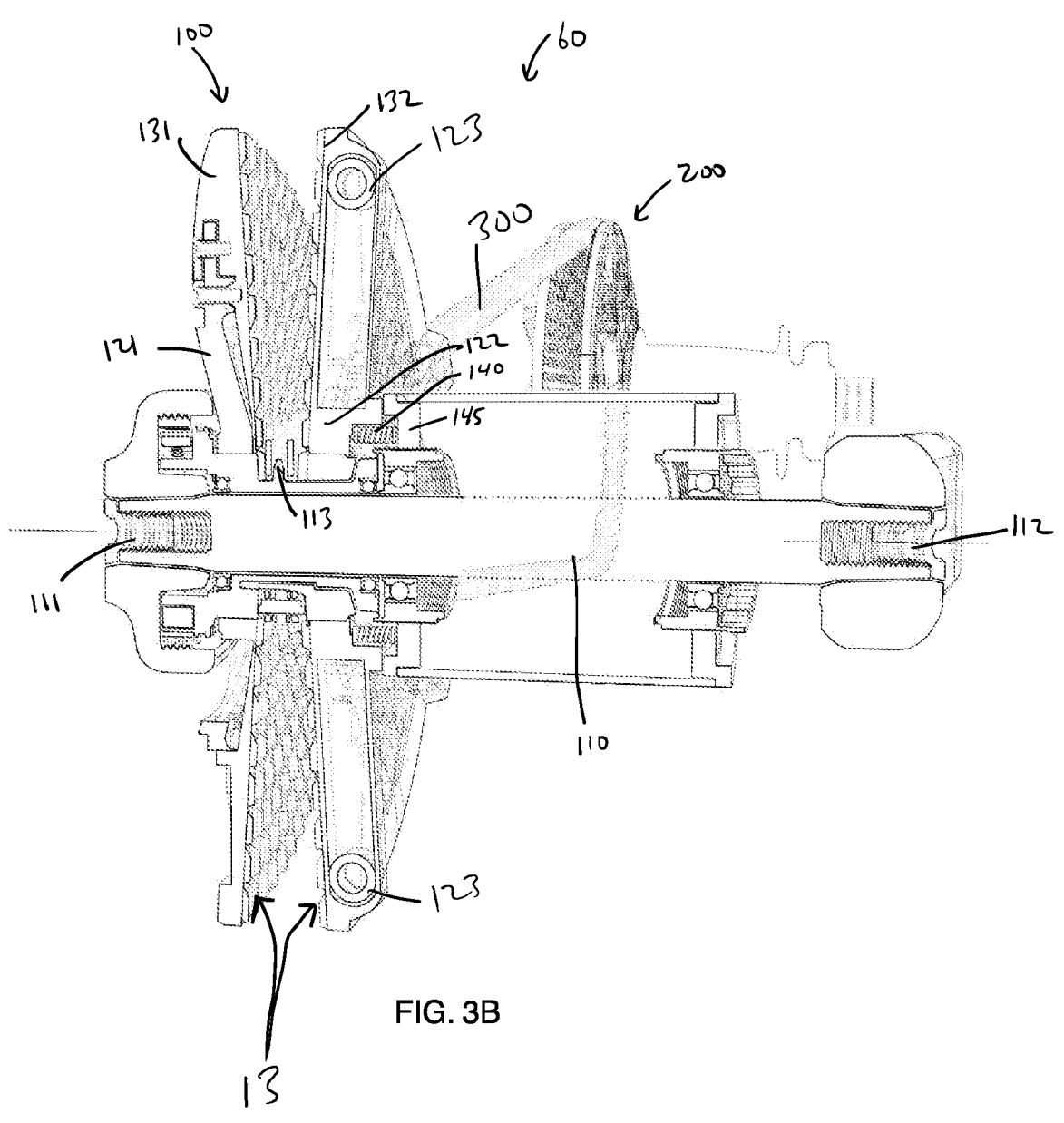
Figure 3C:
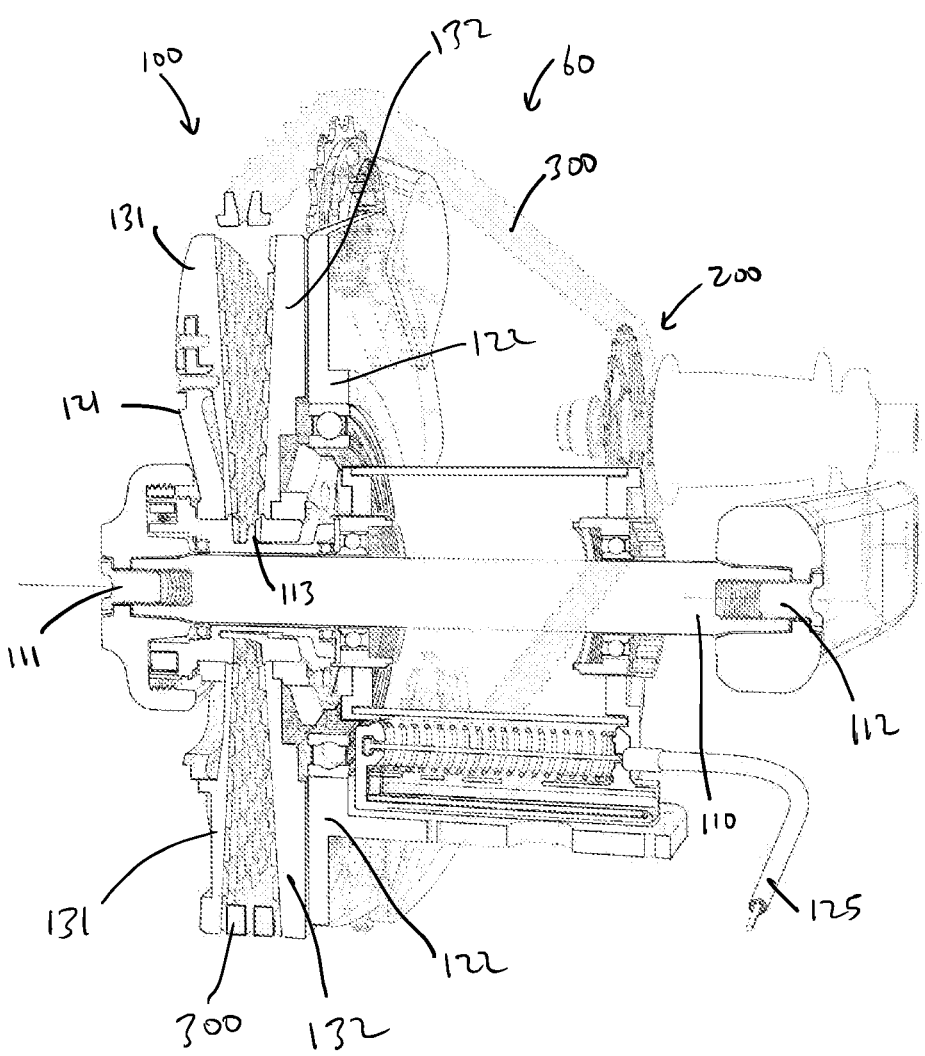
FIGS. 3C-3D depict a cross-section through the front crankset of the bicycle drivetrain shown in FIGS. 1A-1B in a high gear ratio configuration and a low gear ratio configuration, having a manual shifter.

FIGS. 3A-3C are cross-sectional views of the front crankset 100 in different states (or orientations or configurations). Referring first to FIGS. 3A-3C, the front crankset 100 includes an axle 110 having a two pedal attachment portions 111, 112, a main (or outer) rider 121, a glider (or inner rider)

122, the outer mesh plate 131 coupled to the main (or outer) rider 121, and the inner mesh plate 132 coupled to the glider (or inner rider) 122. As used herein to describe components of the front crankset 100, "outer" refers to relatively away from the frame 20 and "inner" refers to relatively near to the frame 20.

The axle 110 extends through the frame 20 and as one of the pedals 55 attached at each end thereof by, for example, a groove and protrusion arrangement. For example, the pedal attachment portions 111, 112 of the axle 110 may have a plurality of grooves arranged circumferentially around the axle 110, and the pedals 55 may have corresponding protrusions that fit into the grooves in the axle 110. As the pedals 55 are rotated forward (e.g., in the clockwise direction as described above), the axle 110 is rotated in the same direction about its central axis.

In the illustrated embodiment, the drivetrain 60 also includes a chainring 113. The chainring 113 may be a sprocket (e.g., a 7-tooth, an 8-tooth, or a 9-tooth sprocket) formed around the axle 110. The chainring 113 may be formed integrally with the main rider 121 (e.g., the chainring 113 may be protrusions protruding from the main rider 121) or may be formed as a separate sprocket and connected (e.g., welded) to the main rider 121. In this manner, the chainring 113 is configured to rotate with the main rider 121 around the axle 110. In some embodiments, the chainring 113 may be omitted.

The main rider 121 and the glider 122 may be coupled to the axle 110 to rotate with the axle 110. The main rider 121 may be fixed in place relative to the axle 110 (e.g., the main rider 121 may not move laterally with respect to the axis of the axle 110) while the glider 122 is configured to move toward and away from the main rider 121. For example, the glider 122 is configured to move in a direction parallel to the axis of the axle 110 toward and away from the main rider 121.

The front crankset 100 may further include a spring 140 in a housing 145. The spring 140 may be, for example, a wave spring 140. The spring 140 applies pressure to an inner surface of the glider 122 to push it (bias it), and the inner mesh plate 132 coupled thereto, toward the main rider 121. The glider 122 and the inner mesh plate 132 coupled thereto may be moved (e.g., pulled) away from the main rider 121 (and the outer mesh plate 131 coupled thereto) by, for example, an automatic shifter (e.g., roller weights) or manual shifter (e.g., an index shifter), both of which are described in more detail below. The housing 145 may be connected to the main rider 121 by, for example, a groove and protrusion fitment.

FIGS. 3A-3B depict the front crankset 100 having an automatic shifter according to one embodiment of the present disclosure. FIG. 3A depicts the bicycle drivetrain in a low gear configuration and FIG. 3B depicts the bicycle drivetrain in a high gear configuration. In the embodiment depicted in FIGS. 3A-3B, the front crankset 100 includes roller weights 123 coupled to the glider 122 (e.g., the roller weights 123 are slidable within an elongated opening in the glider 122). In response to the user pedaling at or above a threshold rate, the roller weights 123 are configured to overcome the biasing force of the spring 140 and to slide and pull the glider 122 (and the inner mesh plate 132 coupled thereto) away from the main rider 121 (and the outer mesh plate 131 coupled thereto). Roller weights, as known to those of ordinary skill in the art, move away from an axis of rotation as rotational speed and, therefore, centrifugal force, increases. In an embodiment using the roller weights 123, the distance between the main rider 121 and the glider 122 may automatically vary (e.g., may vary without user input other than pedal input). For example, as the rotational speed of the axle 110 increases, the roller weights 123 act against the spring 140 and pull the glider 122 away from the main rider 121. As will be described in more detail below, this causes the bicycle drivetrain 60 to move from a higher gear ratio configuration (more speed but less torque) in which the hybrid chain 300 is further from the axle 110 (shown in FIG. 3A) to a lower gear ratio configuration (more torque but less speed) in which the hybrid chain 300 is nearer to the axle 110 (shown in FIG. 3B). As the rotational speed of the axle 110 decreases, the spring 140 acts against the roller weights to push the glider 122 toward the main rider 121, causing the drivetrain 60 to move from a lower gear ratio configuration in which the hybrid chain 300 is nearer to the axle 110 (shown in FIG. 3B) to a higher gear ratio configuration in which the hybrid chain 300 is further from the axle 110 (shown in FIG. 3A). It should be understood that the drivetrain 60 is configured to exhibit any intermediate gear ratio between the high gear ratio configuration depicted in FIG. 3A and the low gear ratio configuration depicted in FIG. 3B.

Figure 3D:
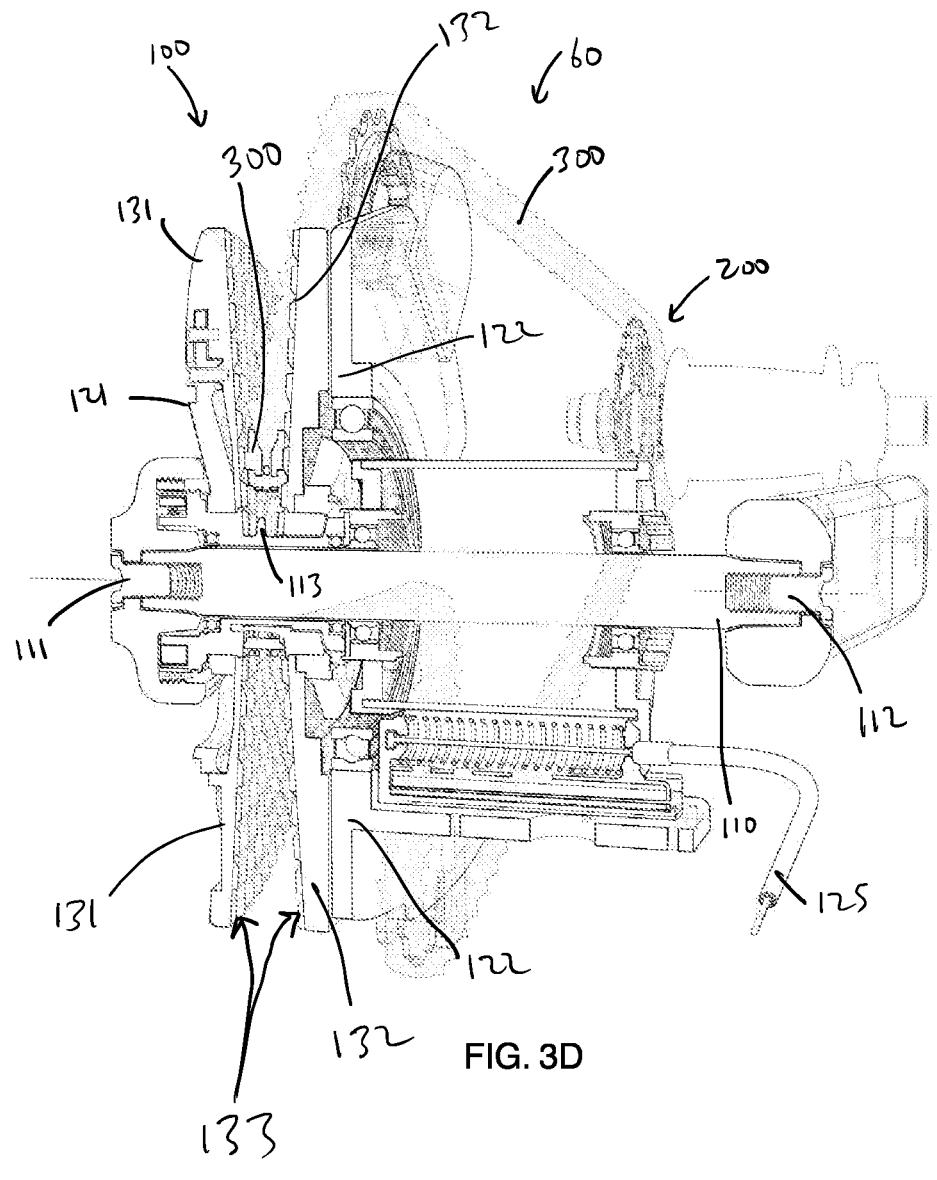

FIGS. 3C-3D depict the front crankset 100 having a manual shifter according to one embodiment of the present disclosure. FIG. 3C depicts the bicycle drivetrain in a low gear configuration and FIG. 3D depicts the bicycle drivetrain in a high gear configuration. In the embodiment depicted in FIGS. 3C-3D, the drivetrain 60 includes an index shifter 124 (see FIG. 1B) to move the glider 122. The index shifter 124 may be located on the handlebars 50 to be controlled by the rider. As the rider moves (e.g., rotates) the index shifter 124 to select a higher gear, a cable 125 connected between the index shifter 124 and the glider 122 may pull the glider 122 away from the main rider 121 and against the spring 140. As the user selects a lower gear on the index shifter 124, the cable 125 between the index shifter 124 and the glider 122 is relaxed and the spring 140 pushes the glider 122 back toward the main rider 121.

The outer mesh plate 131 is mounted (e.g., removably mounted) to an inner surface of the main rider 121, and the inner mesh plate 132 is mounted (e.g., removably mounted) to an outer surface of the glider 122. In other words, the outer and inner mesh plates 131 and 132 face each other between the main rider 121 and the glider 122, and the inner mesh plate moves with the glider 122.

Figures 4A, 4B:
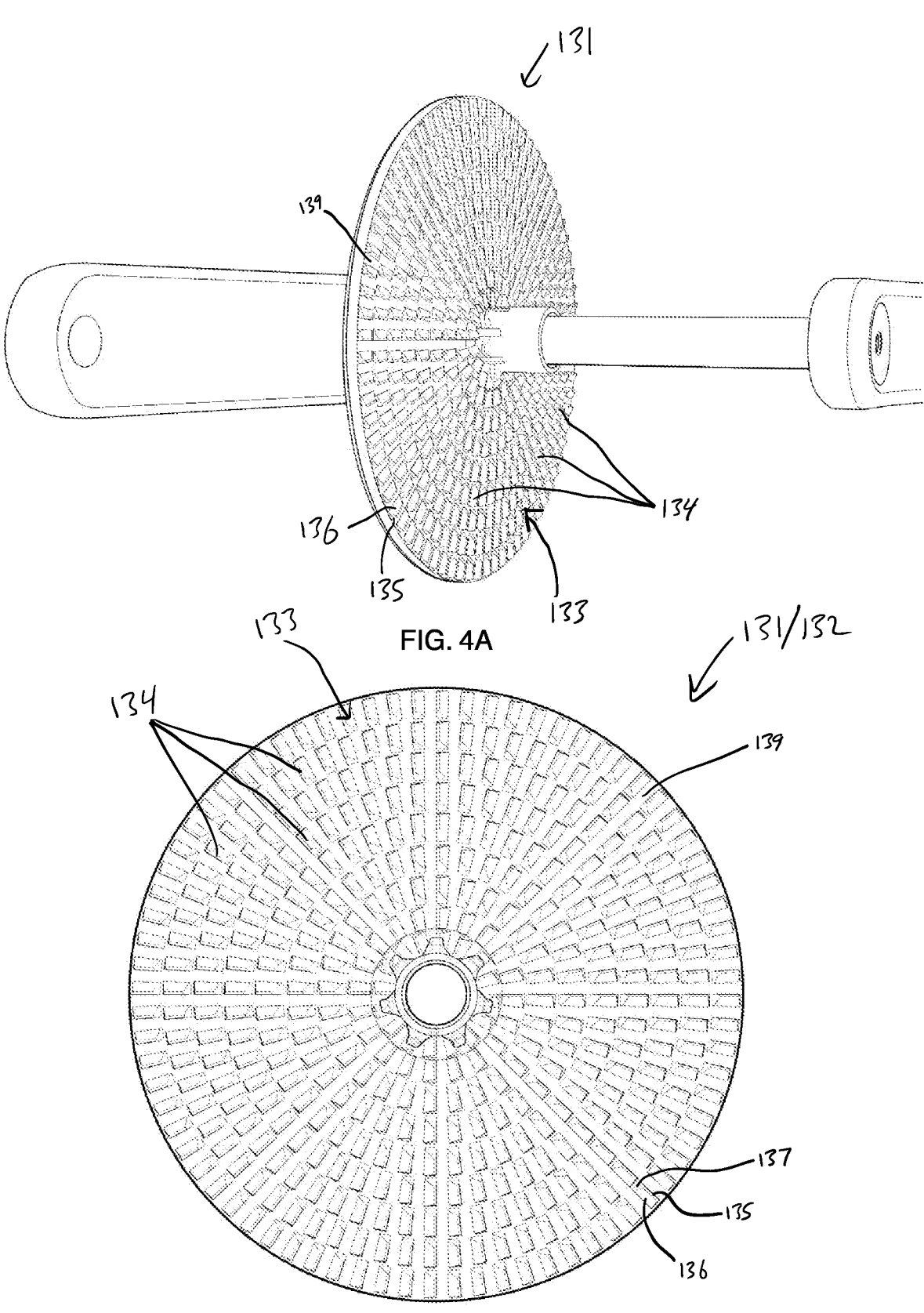
FIGS. 4A-4B show a perspective view and a front view, respectively, of a mesh plate having a stepped concave pattern according to one embodiment of the present disclosure.
Figure 4C:
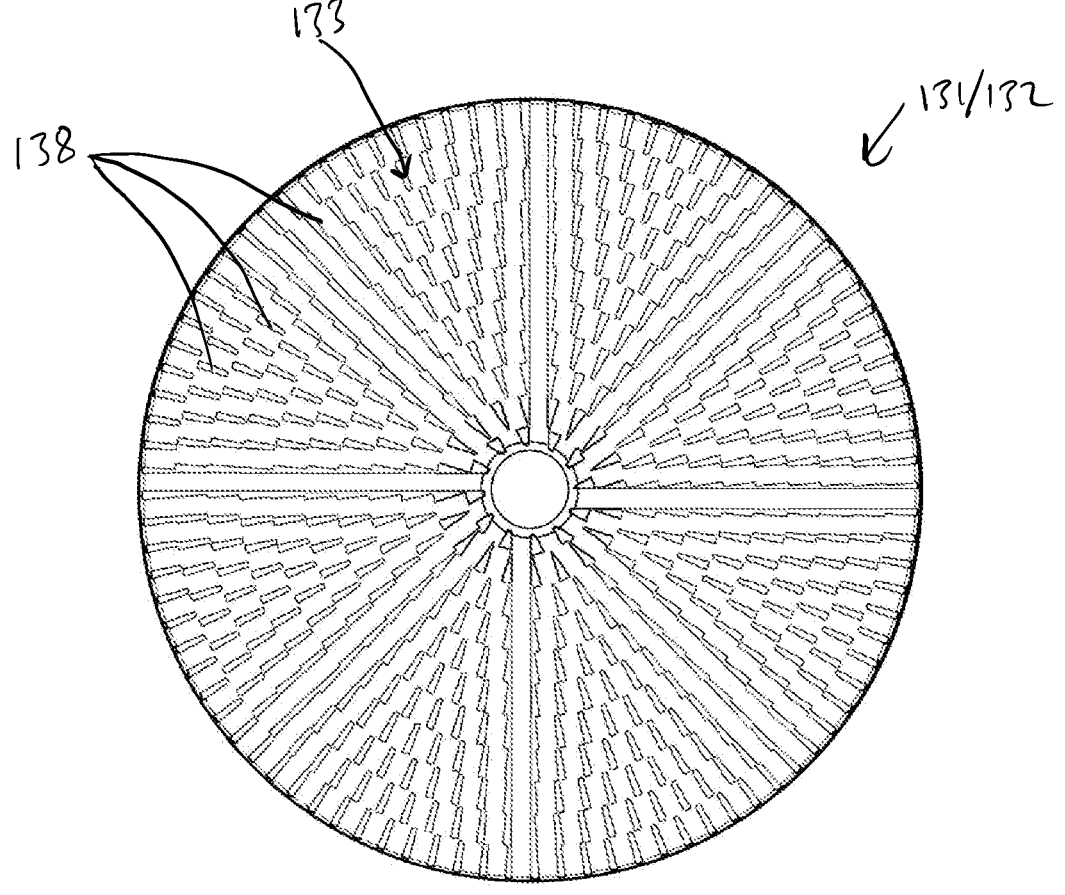
FIG. 4C shows a front view of a mesh plate including a stepped convex pattern according to another embodiment of the present disclosure.

The outer and inner mesh plates 131 and 132 each have a pattern 133 formed thereon to interact with the hybrid chain 300. Examples of some different patterns formed on the outer and inner mesh plates 131 and 132 are shown in FIGS. 4A-4C. The pattern 133 may be, for example, a plurality of radially-arranged protrusions, a plurality of radially-arranged grooves (or depressions) or openings (e.g., holes). In some embodiments, the pattern 133 may be (or include) linear grooves or protrusions that extend radially in a direction perpendicular to the axis of the axle 110. FIGS. 4A-4B depict an embodiment of the outer and inner mesh plates 131 and 132 including a stepped concave pattern. In the embodiment illustrated in FIGS. 4A-4B, the pattern 133 on the outer and inner mesh plates 131 and 132 includes a plurality of projections 134 arranged in a plurality of concentric rings (e.g., a first plurality of projections arranged in a first ring, a second plurality of projections arranged in a second ring around the first ring, a third plurality of projections arranged in a third ring around the third ring, etc.). In the embodiment illustrated in FIG. 4A, the projections 134 arranged in each ring are circumferentially spaced apart from each other (e.g., the projections 134 may be discrete projections). In the embodiment illustrated in FIGS. 4A-4B, each of the projections 134 has a triangular cross-sectional shape (e.g., a right-triangular cross-sectional shape) with a flat surface 135 facing a direction of rotation of the outer and inner mesh plates 131 and 132, and a sloped surface 136 extending from the flat surface 135 in a direction opposite to the direction of rotation of the outer and inner mesh plates 131 and 132. Additionally, in the illustrated embodiment, each of the projections 134 is elongated in a radial direction of the outer and inner mesh plates 131 and 132. Furthermore, in the illustrated embodiment, each of the projections 134 includes a sloped surface 137 facing radially inward toward an axis of rotation of the outer and inner mesh plates 131 and 132.

FIG. 4C depicts an embodiment of the outer and inner mesh plates 131 and 132 including a stepped convex pattern. In the embodiment illustrated in FIG. 4C, the pattern 133 includes a plurality of grooves or depressions 138 arranged in a plurality of concentric rings (e.g., a plurality of depressions arranged in a first ring, a plurality of depressions arranged in a second ring around the first ring, a plurality of depressions arranged in a third ring around the third ring, etc.). In the embodiment illustrated in FIG. 4C, the depressions 138 arranged in each ring are circumferentially spaced apart from each other.

As will be explained in more detail below, the pattern 133 formed on (or in) the outer and inner mesh plates 131 and 132 is configured to interact with sides (e.g., lateral sides) of the hybrid chain 300.

The main rider 121 and the glider 122 may be formed of, for example, a metal, carbon fiber, etc., while the outer and inner mesh plates 131 and 132 may be formed of, for example, a consumable material, such as a relatively soft metal, fiber reinforced plastic, etc. Because the outer and inner mesh plates 131 and 132 contact the hybrid chain 300, they may be considered consumable parts that need replaced periodically.

Facing surfaces 139 of the outer and inner mesh plates 131 and 132 that face each other (on or in which the pattern 133 is formed) may be cambered away from each other, such that, for example, each of the facing surfaces 139 of the outer and inner mesh plates 131 and 132 are on a plane that is in a range of about 2 degrees to about 10 degrees off from a plane that is perpendicular to the axis of the axle 110. The angle of the facing surfaces 139 of the outer and inner mesh plates 131 and 132 may be determined in accordance with a width of the hybrid chain 300. For example, in one embodiment, the hybrid chain 300 may have a width of 9.85 mm and the surface 139 of the outer mesh plate 131 may extend on a plane that is −3 degrees from the direction perpendicular to the axis of the axle 110 while the surface 139 of the inner mesh plate 132 may extend on a plane that is +3 degrees from the direction perpendicular to the axis of the axle 110. In this way, even as the outer and inner mesh plates 131 and 132 move toward and away from each other, the hybrid chain 300 maintains consistent contact with the patterns in the mesh plates 131 and 132.

The height of the outer and inner mesh plates 131 and 132 is not particularly limited but may be about 96.7 mm from the axis of the axle 110, which would simulate a 46 tooth chainring when the hybrid chain 300 is at the highest position from the axis of the axle 110 (e.g., when the outer and inner mesh plates 131 and 132 are at their nearest distance from each other).

FIGS. 5A-5F show a portion of the hybrid chain 300 shown in FIGS. 1A-3C according to various embodiments of the present disclosure.

Figures 5A, 5B, 5C:
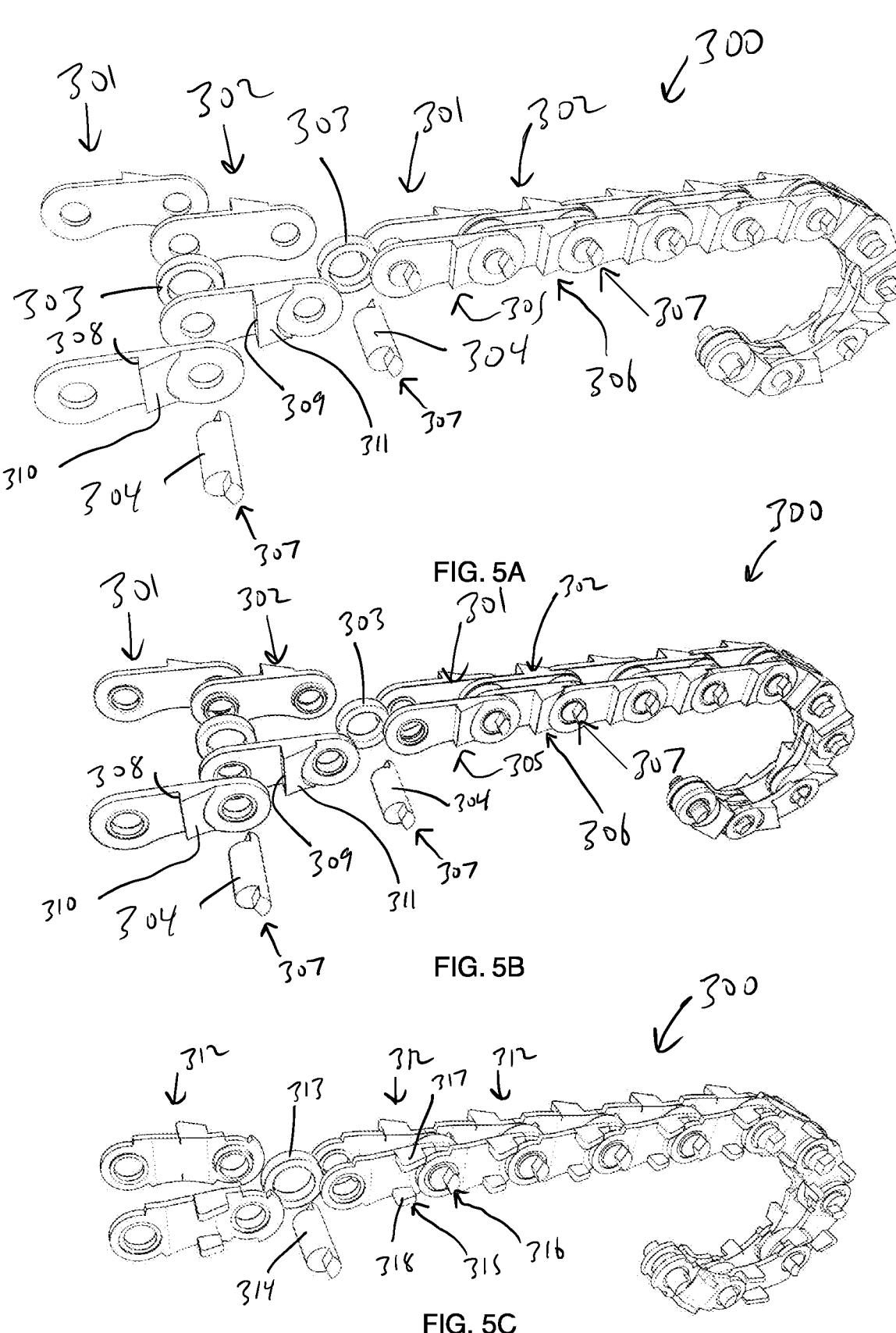
FIGS. 5A-5F show a portion of the hybrid chain according to various embodiments of the present disclosure.

In FIGS. 5A-5B, the hybrid chain 300 includes a plurality of alternately arranged and interconnected outer links 301 and inner links 302. Adjacent outer and inner links 301, 302 are hingedly coupled to each other with a roller 303 and a pin 304 extending through corresponding openings in the outer link 301, the inner link 302, and the roller 303. Additionally, in the illustrated embodiment, the hybrid chain 300 includes chain patterns 305, 306, 307 on lateral side surfaces of the outer links 301, the inner links 302, and the pin 304, respectively, that correspond to the patterns 133 on (or in) the outer and inner mesh plates 131 and 132. For example, some or all of the outer links 301 may include the pattern 305, some or all of the inner links 302 may include the pattern 306, and some or all of the pins 304 may include the patterns 307.

In one or more embodiments, because the lateral side surfaces of the hybrid chain 300 contact the facing surfaces 139 of the mesh plates 131 and 132, which are not exactly perpendicular (e.g., the facing surfaces 139 are tapered or cambered away from each other), the patterns 305, 306, 307 may have a corresponding taper. For example, a bottom of the patterns 305, 306, 307 may extend further from the corresponding outer link 301, inner link 302, and pin 304 than a top thereof, for example, to form an outer edge having about a 2.5 degree angle, although the patterns 305, 306, 307 may have any other suitable taper depending on the taper (or camber) of the outer and inner mesh plates 131, 132.

In the illustrated embodiment, for example, the chain patterns 305, 306 on the outer links 301 and inner links 302 are triangular protrusions (e.g., protrusions having a right triangular cross-sectional shape) having a flat surface 308, 309, respectively, facing a direction of rotation of the hybrid chain 300, and a sloped surface 310, 311, respectively, extending from the flat surface 308, 309, respectively, in a direction opposite to the direction of rotation of the hybrid chain 300. The patterns 305, 306, 307 are configured to interact with the patterns 133 in the outer and inner mesh plates 131 and 132. For instance, in one or more embodiments in which the outer and inner mesh plates 131, 132 include the projections 134 (see FIGS. 4A-4B), the flat surfaces 308, 309 of the chain patterns 305, 306 engage (e.g., contact) the flat surfaces 135 of the projections 134 on the outer and inner mesh plates 131, 132. In one or more embodiments in which the outer and inner mesh plates 131, 132 include the grooves or depressions 138 (see FIG. 4C), portions of the chain patterns 305, 306 extend at least partially into the grooves or depressions 138 (i.e., the grooves or depressions 138 are sized and/or shaped to fit (or accommodate) the chain patterns 305, 306 of the hybrid chain 300). Although in the illustrated embodiment each of the chain patterns 305, 306 includes a plurality of projections having a triangular (e.g., a right triangle) cross-sectional shape, in one or more embodiments the chain patterns 305, 306 may have any other suitable shapes depending on the configuration of the patterns 133 on or in the outer and inner mesh plates 131, 132. The hybrid chain 300 depicted in FIG. 5A may be 3D printed, and the hybrid chain 300 depicted in FIG. 5B may be machined.

In the embodiment illustrated in FIG. 5C, the hybrid chain 300 includes a plurality of interconnected links 312. Adjacent links 312 are hingedly coupled to each other with a roller 313 and a pin 314 extending through corresponding openings in the links 312. Unlike the embodiment of the hybrid chain 300 depicted in FIGS. 5A-5B that includes inner and outer links, the links 312 depicted in the embodiment illustrated in FIG. 5C function as both inner and outer links. In the illustrated embodiment, each link 312 tapers or transitions between a wider rear end and a narrower front end such that the wider rear end of each link 312 is outside of the narrower front end of the adjacent link 312 (i.e., the narrower front end of each link 312 extends into the wider rear end of the adjacent link 312).

Additionally, in the illustrated embodiment, the hybrid chain 300 includes chain patterns 315, 316 on lateral side surfaces of the links 312 and the pin 314, respectively, that correspond to the patterns 133 on (or in) the outer and inner mesh plates 131 and 132. Some or all of the links 312 may include the pattern 315 and some or all of the pins 314 may include the patterns 316. In the illustrated embodiment, the patterns 315 on the links 312 are flanges or tabs that are tapered in the forward direction of the hybrid chain 300 (e.g., the flanges or tabs are sloped or angled with respect to a direction perpendicular to the movement direction of the hybrid chain 300 on the bicycle 10). In the illustrated embodiment, the pattern 315 includes a pair of flanges or tabs 317, 318 on each lateral side of each of the links 312 (e.g., an upper flange or tab 317 and a lower flange or tab 318 on each lateral side of the links 312). In one or more embodiments, the patterns 315, 316 may have a taper. In one or more embodiments, the upper flanges or tabs 317 on links 312 may extend further from the lateral sides of the links 312 than the lower flanges or tabs 318, and a bottom of the patterns 316 may extend further from pin 314 than a top thereof. For example, the patterns 315, 316 may be tapered at an angle of about 2.5 degrees, although the patterns 315, 316 may have any other suitable taper depending on the taper (camber) of the outer and inner mesh plates 131, 132. Although in the illustrated embodiment the chain pattern 315 on each lateral side of the links 312 includes a pair of tapered projections 317,318, in one or more embodiments the chain pattern 315 may have any other suitable configuration (e.g., shape, size, and number) depending on the configuration of the pattern 133 on or in the outer and inner mesh plates 131, 132. The hybrid chain 300 depicted in FIG. 5C may be stamped.

Figures 5D, 5E, 5F:
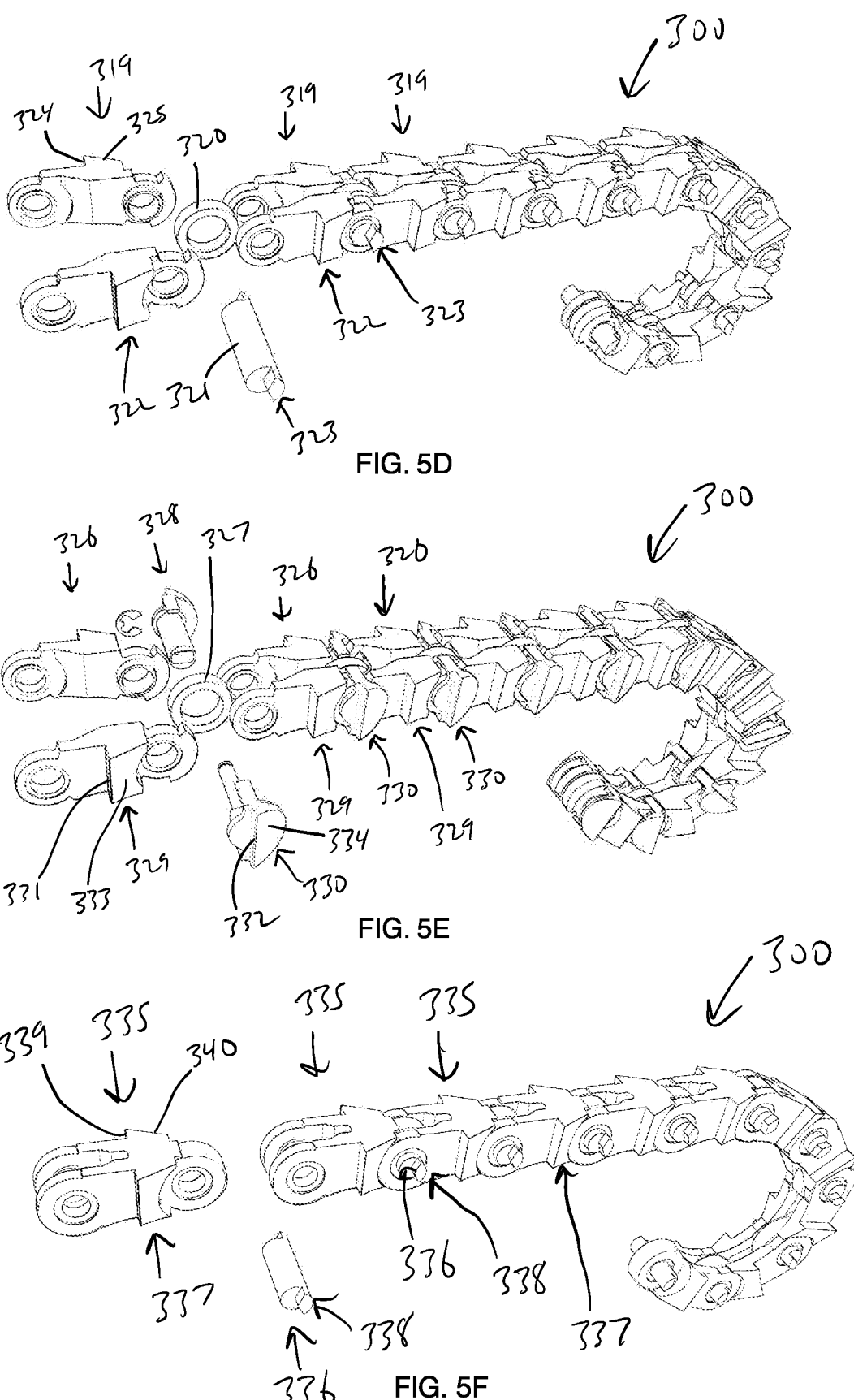

In the embodiment illustrated in FIG. 5D, the hybrid chain 300 includes a plurality of interconnected links 319. Adjacent links 319 are hingedly coupled to each other with a roller 320 and a pin 321 extending through corresponding openings in the links 319. In the illustrated embodiment, each link 319 tapers or transitions between a wider rear end and a narrower front end such that the wider rear end of each link 319 is outside of the narrower front end of the adjacent link 319 (i.e., the narrower front end of each link 319 extends into the wider rear end of the adjacent link 319).

Additionally, in the illustrated embodiment, the hybrid chain 300 includes chain patterns 322, 323 on lateral side surfaces of the links 319 and the pin 321, respectively, that correspond to the patterns 133 on (or in) the outer and inner mesh plates 131 and 132. Some or all of the links 319 may include the pattern 322 and some or all of the pins 321 may include the patterns 323. In the illustrated embodiment, for example, the patterns 322 on the links 319 are triangular protrusions (e.g., protrusions having a right triangular cross-sectional shape) having a flat surface 324 facing a direction of rotation of the hybrid chain 300 and a sloped surface 325 extending from the flat surface 324 in a direction opposite to the direction of rotation of the hybrid chain 300. The patterns 322, 323 are configured to interact with the patterns 133 in the outer and inner mesh plates 131 and 132. For instance, in one or more embodiments in which the outer and inner mesh plates 131, 132 include the projections 134 (see FIGS. 4A-4B), the flat surfaces 324 of the chain pattern 322 engage (e.g., contact) the flat surfaces 135 of the projections 134 on the outer and inner mesh plates 131, 132. In one or more embodiments in which the outer and inner mesh plates 131, 132 include the grooves or depressions 138 (see FIG. 4C), portions of the chain pattern 322 extend at least partially into the grooves or depressions 138 (i.e., the grooves or depressions 138 are sized and/or shaped to fit (or accommodate) the chain pattern 322 of the hybrid chain 300). Although in the illustrated embodiment the chain pattern 322 includes a plurality of projections having a triangular (e.g., a right triangle) cross-sectional shape, in one or more embodiments the chain pattern 322 may have any other suitable shape depending on the configuration of the patterns 133 on or in the outer and inner mesh plates 131, 132. The hybrid chain 300 depicted in FIG. 5D may be machined.

In the embodiment illustrated in FIG. 5E, the hybrid chain 300 includes a plurality of interconnected links 326. Adjacent links 326 are hingedly coupled to each other with a roller 327 and an active pin 328 extending through corresponding openings in the links 326. In the illustrated embodiment, the active pin 328 includes two components (e.g., two halves) coupled together. Unlike the pins described above in the embodiments depicted in FIGS. 5A-5D, the active pins 328 rotate with the movement of the hybrid chain 300. In the illustrated embodiment, each link 326 tapers or transitions between a wider rear end and a narrower front end such that the wider rear end of each link 326 is outside of the narrower front end of the adjacent link 326 (i.e., the narrower front end of each link 326 extends into the wider rear end of the adjacent link 326).

Additionally, in the illustrated embodiment, the hybrid chain 300 includes chain patterns 329, 330 on lateral side surfaces of the links 326 and the pin 328, respectively, that correspond to the patterns 133 on (or in) the outer and inner mesh plates 131 and 132. Some or all of the links 326 may include the pattern 329 and some or all of the pins 328 may include the patterns 330. In the illustrated embodiment, for example, the patterns 329, 330 are triangular protrusions (e.g., a right triangular cross-sectional shape) having a flat surface 331, 332, respectively, facing a direction of rotation of the hybrid chain 300, and a sloped surface 333, 334, respectively, extending from the flat surface 331, 332, respectively, in a direction opposite to the direction of rotation of the hybrid chain 300. The patterns 329, 330 are configured to interact with the patterns 133 in the outer and inner mesh plates 131 and 132. For instance, in one or more embodiments in which the outer and inner mesh plates 131, 132 include the projections 134 (see FIGS. 4A-4B), the flat surfaces 331, 332 of the chain patterns 329, 330 engage (e.g., contact) the flat surfaces 135 of the projections 134 on the outer and inner mesh plates 131, 132. In one or more embodiments in which the outer and inner mesh plates 131, 132 include the grooves or depressions 138 (see FIG. 4C), portions of the chain patterns 329, 330 extend at least partially into the grooves or depressions 138 (i.e., the grooves or depressions 138 are sized and/or shaped to fit (or accommodate) the chain patterns 329, 330 of the hybrid chain 300). Although in the illustrated embodiment each of the chain patterns 329, 330 includes a plurality of projections having a triangular (e.g., a right triangle) cross-sectional shape, in one or more embodiments the chain patterns 329, 330 may have any other suitable shapes depending on the configuration of the patterns 133 on or in the outer and inner mesh plates 131, 132. The hybrid chain 300 depicted in FIG. 5E may be machined.

In the embodiment illustrated in FIG. 5F, the hybrid chain 300 is a universal chain including a plurality of interconnected links 335. Adjacent links 335 are hingedly coupled to each other with a pin 336 extending through corresponding openings in the links 335. In the illustrated embodiment, each link 335 tapers or transitions between a wider rear end and a narrower front end such that the wider rear end of each link 335 is outside of the narrower front end of the adjacent link 335 (i.e., the narrower front end of each link 335 extends into the wider rear end of the adjacent link 335). Unlike the embodiments of the hybrid chain 300 depicted in FIGS. 5A-5E, the embodiment of the hybrid chain 300 depicted in FIG. 5F does not include rollers.

Additionally, in the illustrated embodiment, the hybrid chain 300 includes chain patterns 337, 338 on lateral side surfaces of the links 335 and the pins 336, respectively, that correspond to the patterns 133 on (or in) the outer and inner mesh plates 131 and 132. Some or all of the links 335 may include the pattern 337 and some or all of the pins 336 may include the patterns 338. In the illustrated embodiment, for example, the patterns 337 are triangular protrusions (e.g., a right triangular cross-sectional shape) having a flat surface 339 facing a direction of rotation of the hybrid chain 300 and a sloped surface 340 extending from the flat surface 339 in a direction opposite to the direction of rotation of the hybrid chain 300. The patterns 337, 338 are configured to interact with the patterns 133 in the outer and inner mesh plates 131 and 132. For instance, in one or more embodiments in which the outer and inner mesh plates 131, 132 include the projections 134 (see FIGS. 4A-4B), the flat surfaces 339 of the chain pattern 337 engage (e.g., contact) the flat surfaces 135 of the projections 134 on the outer and inner mesh plates 131, 132. In one or more embodiments in which the outer and inner mesh plates 131, 132 include the grooves or depressions 138 (see FIG. 4C), portions of the chain pattern 337 extend at least partially into the grooves or depressions 138 (i.e., the grooves or depressions 138 are sized and/or shaped to fit (or accommodate) the chain pattern 337 of the hybrid chain 300). Although in the illustrated embodiment the chain pattern 337 includes a plurality of projections having a triangular (e.g., a right triangle) cross-sectional shape, in one or more embodiments the chain pattern 337 may have any other suitable shape depending on the configuration of the patterns 133 on or in the outer and inner mesh plates 131, 132. The hybrid chain 300 depicted in FIG. 5F may be machined.

The operation of the bicycle drivetrain 60 according to embodiments of the present disclosure will now be described in more detail with respect to FIGS. 3A-3D. FIGS. 3A and 3C shows the drivetrain 60 in the highest gear equivalent to a conventional drivetrain, and FIGS. 3B and 3D show the drivetrain in the lowest gear ratio. Because in the highest gear state shown in FIGS. 3A and 3C the hybrid chain 300 is coupled to and moved by the mesh plates 131 and 132 and not by a chainring, gear "equivalent" is used herein. For example, the position of the hybrid chain 300 shown in FIGS. 3A and 3C may be equivalent to a 46 tooth chainring in a conventional drivetrain. As shown in FIGS. 3A and 3C, the main rider 121 and glider 122 contact each other near the axle 110 as a stop (e.g., a physical stop) and, due to the angled plane on which the mesh plates 131 and 132 and main rider 121 and glider 122 extend, the hybrid chain 300 fits between the mesh plates 131 and 132 at (or near) the outermost portion of the mesh plates 131 and 132. For example, the hybrid chain 300 may have a width of 9.85 mm, the mesh plates 131 and 132 may have a distal end that is 96.7 mm from the axis of the axle 110, and the facing surfaces of the mesh plates 131 and 132 may be on planes that are −3 degrees and +3 degrees with respect to a direction perpendicular to the axis of the axle 110.

The patterns (e.g., the patterns 305, 306, 307 depicted in FIGS. 5A-5B; the chain patterns 315, 316 depicted in FIG. 5C; the chain patterns 322, 323 depicted in FIG. 5D; the chain patterns 337, 338 depicted in FIG. 5E; or the chain patterns 337, 338 depicted in FIG. 5F) of the hybrid chain 300 interact with (e.g., fit into or receive) the corresponding patterns 133 of the mesh plates 131 and 132. Although the facing surfaces 139 of the mesh plates 131 and 132 are tapered, the patterns of the hybrid chain 300 smoothly contact the pattern of the mesh plates 131 and 132 due to the taper of the patterns of the hybrid chain 300.

Referring to FIGS. 3B and 3D, as the rider accelerates, the rider may desire a lower gear. In embodiments including the index shifter 124 (see FIGS. 3C-3D), the rider may select a lower gear, which causes the cable 125 to pull the inner mesh plate 132 away from the outer mesh plate 131 by moving the glider 122. In embodiments including the roller weights 123 (see FIGS. 3A-3B), the roller weights 123 automatically cause the glider 122 and the inner mesh plate 132 to slide away from the outer mesh plate 131 as the rider pedals faster. As the mesh plates 131 and 132 are spaced farther apart, the hybrid chain 300 smoothly moves down (e.g., toward the axis of the axle 110) and connects to different ones of the patterns of the mesh plates 131 and 132. As the hybrid chain 300 moves down, the gear equivalent of the drivetrain 60 decreases. Thus, without the weight of multiple chainrings as in a convention front crankset, the front crankset 100 according to embodiments of the present disclosure provides numerous gear equivalents by the movement of the inner mesh plate 132 away from the outer mesh plate 131.

Referring to FIGS. 3B and 3D, when the rider selects the lowest gear, the mesh plates 131 and 132 spread apart to reveal the chainring 112 on the axle 110. The chainring 112 may be, for example, a 7 tooth, 8 tooth, or 9 tooth chainring. In this state, the front crankset 100 acts similar to a conventional crankset in that the rollers 340 of the hybrid chain 300 contact and ride on the chainring 112 while the patterns of the hybrid chain 300 do not contact any corresponding structure.

Due to the main rider 121 and the glider 122 moving far enough apart to allow the hybrid chain 300 to ride on the chainring 112, the front crankset 100 can handle more torque at the lowest gear. For example, in embodiments that omit the chainring 112, the lowest gear equivalent may be limited by the number of patterns of the mesh plates 131 and 132 contacting the patterns of the hybrid chain 300. In other words, as the mesh plates 131 and 132 move farther apart, the number of patterns of the mesh plates 131 and 132 in contact with corresponding ones of the patterns of the hybrid chain 300 is reduced, thereby lowering the maximum torque that can be imparted to the hybrid chain 300 from the mesh plates 131 and 132 based on the connection strength therebetween. By transitioning to a chainring drive at the lowest gear, embodiments of the present disclosure provide improved torque handling at the lowest gear.

As the user desires higher gear equivalents, the mesh plates 131 and 132 are moved back toward each other, which pushes (e.g., squeezes) the hybrid chain 300 up (e.g., away from the axis of the axle 110) to provide a higher gear equivalent, as shown for example in FIGS. 3A and 3C.

It will be understood that, although the terms "first", "second", "third", etc., may be used herein to describe various elements, components, regions, layers, levels, and/or sections, these elements, components, regions, layers, levels, and/or sections should not be limited by these terms. These terms are only used to distinguish one element, component, region, layer, level, or section from another element, component, region, layer, level, or section. Thus, a first element, component, region, layer, level, or section discussed below could be termed a second element, component, region, layer, level, or section, without departing from the spirit and scope of the inventive concept.

Spatially relative terms, such as "beneath", "below", "lower", "under", "above", "upper" and the like, may be used herein for ease of description to describe one element or feature's relationship to another element(s) or feature(s) as illustrated in the figures. It will be understood that such spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present disclosure". Also, the terms "exemplary" and "example" are intended to refer to an example or illustration. As used herein, the terms "use," "using," and "used" may be considered synonymous with the terms "utilize," "utilizing," and "utilized," respectively.

It will be understood that when an element or layer is referred to as being "on," "connected to," "coupled to," or "adjacent to" another element or layer, it may be directly on, connected to, coupled to, or adjacent to the other element or layer, or one or more intervening elements or layers may be present. In contrast, when an element or layer is referred to as being "directly on," "directly connected to," "directly coupled to," or "immediately adjacent to" another element or layer, there are no intervening elements or layers present.

Any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein.

Although example embodiments of a bicycle drivetrain and a bicycle including the bicycle drivetrain have been described and illustrated herein, many modifications and variations within those embodiments will be apparent to those skilled in the art. Accordingly, it is to be understood that the bicycle drivetrain and the bicycle including the bicycle drivetrain according to the present disclosure may be embodied in forms other than as described herein without departing from the spirit and scope of the present disclosure. The present disclosure is defined by the following claims and equivalents thereof.

What is claimed is:

1. A bicycle drivetrain comprising:
a front crankset comprising:
  an axle;
  a main rider on the axle;
  a glider on the axle;
  an outer mesh plate coupled to the main rider;
  an inner mesh plate coupled to the glider, the inner mesh plate being configured to move toward and away from the outer mesh plate; and
  a spring configured to bias the inner mesh plate toward the outer mesh plate;
a rear cog;
a hybrid chain connecting the front crankset and the rear cog, wherein the hybrid chain is configured to mesh with a pattern on each of the outer mesh plate and the inner mesh plate; and
an index shifter coupled to the glider with a cable, wherein movement of the index shifter to select a lower gear causes the cable to pull the glider and the inner mesh plate away from the main rider and the outer mesh plate and compress the spring.

2. The bicycle drivetrain of claim 1, wherein the pattern on each the inner mesh plate and the outer mesh plate comprises a stepped concave pattern.

3. The bicycle drivetrain of claim 1, wherein the pattern on each of the inner mesh plate and the outer mesh plate comprises a stepped convex pattern.

4. The bicycle drivetrain of claim 1, further comprising roller weights coupled to the glider.

5. The bicycle drivetrain of claim 1, wherein the inner mesh plate and the outer mesh plate are cambered away from each other.

6. The bicycle drivetrain of claim 5, wherein an outer surface of the inner mesh plate facing the outer mesh plate and an inner surface of the outer mesh plate facing the inner mesh plate are each angled at an angle in a range from approximately 2 degrees to approximately 10 degrees relative to a plane perpendicular to an axis of the axle.

7. The bicycle drivetrain of claim 1, wherein lateral sides of the hybrid chain facing the inner mesh plate and the outer mesh plate comprise a chain pattern configured to engage the pattern of the inner mesh plate and the outer mesh plate.

8. The bicycle drivetrain of claim 7, wherein the chain pattern a plurality of grooves each having a triangular cross-sectional shape.

9. The bicycle drivetrain of claim 7, wherein the chain pattern is tapered at an angle.

10. The bicycle drivetrain of claim 9, wherein the angle is approximately 2.5 degrees.

11. The bicycle drivetrain of claim 1, further comprising:
a tension idler sprocket; and
a fixed idler sprocket.

12. The bicycle drivetrain of claim 1, wherein the rear cog comprises a pair of mesh plates.

13. A bicycle drivetrain comprising:
a front crankset comprising:
    an axle;
    a main rider on the axle;
    a glider on the axle;
    an outer mesh plate coupled to the main rider;
    an inner mesh plate coupled to the glider, the inner mesh plate being configured to move toward and away from the outer mesh plate; and
    a spring configured to bias the inner mesh plate toward the outer mesh plate;
a rear cog; and
a hybrid chain connecting the front crankset and the rear cog, wherein the hybrid chain is configured to mesh with a pattern on each the outer mesh plate and the inner mesh plate,
wherein the pattern on each the inner mesh plate and the outer mesh plate comprises a stepped concave pattern, and
wherein the stepped concave pattern comprises a plurality of depressions arranged in a plurality of concentric rings.

14. A bicycle drivetrain comprising:
a front crankset comprising:
    an axle;
    a main rider on the axle;
    a glider on the axle;
    an outer mesh plate coupled to the main rider;
    an inner mesh plate coupled to the glider, the inner mesh plate being configured to move toward and away from the outer mesh plate; and
    a spring configured to bias the inner mesh plate toward the outer mesh plate;
a rear cog; and a hybrid chain connecting the front crankset and the rear cog, wherein the hybrid chain is configured to mesh with a pattern on each the outer mesh plate and the inner mesh plate,
wherein the pattern on each of the inner mesh plate and the outer mesh plate comprises a stepped convex pattern, and
wherein the stepped convex pattern comprises a plurality of protrusions arranged in a plurality of concentric rings.

15. A bicycle drivetrain comprising:
a front crankset comprising:
    an axle;
    a main rider on the axle;
    a glider on the axle;
    an outer mesh plate coupled to the main rider:
    an inner mesh plate coupled to the glider, the inner mesh plate being configured to move toward and away from the outer mesh plate; and
    a spring configured to bias the inner mesh plate toward the outer mesh plate;
a rear cog; and
a hybrid chain connecting the front crankset and the rear cog, wherein the hybrid chain is configured to mesh with a pattern on each the outer mesh plate and the inner mesh plate,
wherein lateral sides of the hybrid chain facing the inner mesh plate and the outer mesh plate comprise a chain pattern configured to engage the pattern of the inner mesh plate and the outer mesh plate, and
wherein the chain pattern comprises a plurality of projections each having a triangular cross-sectional shape or a plurality of grooves each having a triangular cross-sectional shape.

16. A bicycle comprising:
a frame;
a front wheel rotatably coupled to the frame;
a rear wheel rotatably coupled to the frame;
handlebars coupled to the frame; and
the bicycle drivetrain of claim 1 coupled to the frame.

17. The bicycle of claim 16, wherein the bicycle is a hardtail bicycle.

18. The bicycle of claim 16, wherein the bicycle is a full suspension bicycle.

* * * * *